US007509293B2

(12) United States Patent
Hibler et al.

(10) Patent No.: US 7,509,293 B2
(45) Date of Patent: Mar. 24, 2009

(54) METHOD FOR ANONYMOUS PURCHASE OF GOODS BY NOT PROVIDING IDENTIFYING INFORMATION TO A NON-HOST ENTITY

(75) Inventors: Kimberly Hibler, Park City, UT (US); Analydia Shooks, Bluffdale, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 11/733,708

(22) Filed: Apr. 10, 2007

(65) Prior Publication Data

US 2007/0185782 A1 Aug. 9, 2007

Related U.S. Application Data

(62) Division of application No. 09/906,456, filed on Jul. 16, 2001.

(60) Provisional application No. 60/220,381, filed on Jul. 24, 2000.

(51) Int. Cl.
*G06Q 99/00* (2006.01)

(52) U.S. Cl. .............................. 705/67; 705/27; 705/26; 705/64; 705/75; 705/65; 345/744; 345/760; 345/764; 709/217; 709/220; 709/223; 709/315; 709/316

(58) Field of Classification Search .................... 705/26, 705/27, 38, 50–59
See application file for complete search history.

(56) References Cited

U.S. PATENT DOCUMENTS 5,175,416 A * 12/1992 Mansvelt et al. ............. 235/379
5,193,114 A *  3/1993 Moseley ..................... 713/183
5,845,260 A   12/1998 Nakano et al.
5,869,825 A    2/1999 Ziarno
5,883,810 A *  3/1999 Franklin et al. ............. 700/232

(Continued)

FOREIGN PATENT DOCUMENTS

WO       WO 00/67178        11/2000

OTHER PUBLICATIONS

Transport Layer Security Working group, "The SSI Protocol, Version 3.0", Nov. 18, 1996 (http://home.netscape.com/eng/ssl3/draft302.txt).*

(Continued)

*Primary Examiner*—Mark Fadok
(74) *Attorney, Agent, or Firm*—Snell & Wilmer L.L.P.

(57) ABSTRACT

A method and system for facilitating the purchase of goods and services anonymously from an e-commerce website is provided. The method includes providing a plurality of transaction account numbers, each of which is associated with a monetary load value. The transaction account numbers are stored in a database having a plurality of records. Each of the records corresponds to one of the transaction account numbers. None of the records are configured to store identifying information of a purchaser of one of the transaction numbers. A request for an authorization of a purchase transaction having a purchase value is received from a remote computer terminal. The request is associated with a transaction account number. If the purchase value does not exceed the monetary value associated with the transaction account number, an authorization message is sent to the remote computer terminal granting the request.

21 Claims, 7 Drawing Sheets

U.S. PATENT DOCUMENTS

| | | | |
|---|---|---|---|
| 5,930,767 A | 7/1999 | Reber et al. | |
| 5,991,413 A | 11/1999 | Arditti et al. | |
| 6,029,890 A * | 2/2000 | Austin | 235/380 |
| 6,047,267 A * | 4/2000 | Owens et al. | 705/34 |
| 6,185,545 B1 | 2/2001 | Resnick et al. | |
| 6,473,500 B1 | 10/2002 | Risafi et al. | |
| 6,505,171 B1 | 1/2003 | Cohen et al. | |
| 6,592,044 B1 | 7/2003 | Wong et al. | |
| 6,615,190 B1 | 9/2003 | Slater | |
| 6,678,633 B2 | 1/2004 | Hessmert et al. | |
| 6,704,714 B1 * | 3/2004 | O'Leary et al. | 705/39 |
| 7,111,078 B2 | 9/2006 | Keorkunian et al. | |
| 7,200,578 B2 | 4/2007 | Paltenghe et al. | |
| 2001/0011250 A1 | 8/2001 | Paltenghe et al. | |
| 2001/0023415 A1 | 9/2001 | Keil | |
| 2001/0032878 A1 * | 10/2001 | Tsiounis et al. | 235/379 |
| 2001/0034720 A1 | 10/2001 | Armes | |
| 2001/0037209 A1 * | 11/2001 | Tarbutton et al. | 705/1 |
| 2002/0019781 A1 * | 2/2002 | Shooks et al. | 705/26 |
| 2002/0026418 A1 | 2/2002 | Koppel et al. | |
| 2002/0133467 A1 | 9/2002 | Hobson et al. | |
| 2003/0105672 A1 * | 6/2003 | Epstein et al. | 705/26 |
| 2005/0197919 A1 | 9/2005 | Robertson | |
| 2005/0199705 A1 | 9/2005 | Beck et al. | |

OTHER PUBLICATIONS

Deborah Radcliff, "Universal servers: Does one size fill all?", Software Magazine, May 1997.*

"Internet Cash," by Internet Cash Corporation, www.internetcash.com, publication date unknown.

"Cash X," by CashX, Inc., 2000.

"UniCashe," by UniCashe.com, inc., Revision Date Jun. 7, 2001, original publication date unknown.

* cited by examiner

METHOD FOR ANONYMOUS PURCHASE OF GOODS BY NOT PROVIDING IDENTIFYING INFORMATION TO A NON-HOST ENTITY

CROSS REFERENCE TO RELATED APPLICATIONS

This application is a divisional of U.S. patent application Ser. No. 09/906,456, filed on Jul. 16, 2001, which application claims benefit from provisional application Ser. No. 60/220,381, filed Jul. 24, 2000, all of which are hereby incorporated by reference.

FIELD OF THE INVENTION

The present invention relates generally to a system and method for purchasing goods and services. More particularly, the system and method allows a consumer to purchase goods and services anonymously over a global computer network.

BACKGROUND OF THE INVENTION

The proliferation of the Internet has resulted in a thriving electronic commerce industry, where more and more products and services are available to consumers from e-commerce websites. In traditional online consumer-merchant transactions, consumers typically provide merchants with transaction numbers (e.g., charge card numbers) from their existing debit, credit or other transaction/service cards (e.g., American Express®, VISA®, MasterCard®, Discover Card®, etc.). However, to obtain such transaction numbers, a consumer typically must have a prior bank or credit card company affiliation, wherein the bank or credit card company retains identifying information, such as name, address, birth date, and credit history about the consumer. Thus, purchasers without bank or credit card company affiliations, such as teenagers, international visitors, and students, and those who cannot acquire credit may be limited with respect to online purchases.

Moreover, transmission of transaction numbers over the Internet via traditional means has created increased opportunities for fraud. For example, it is possible for these numbers to be intercepted during transmission, after transmission, while being stored electronically or at the merchant's online or offline location. In traditional online purchases, a consumer often browses the Internet for items to purchase. When the consumer finds an item that he or she is interested in purchasing, the consumer typically selects the item to add to a virtual shopping cart. When the consumer has finished shopping, and desires to purchase an item, the consumer usually proceeds to a virtual checkout, where the consumer is prompted for payment and delivery information. The consumer then typically is required to enter the appropriate delivery and credit card information, where the consumer enters the credit card number directly from the consumer's physical credit card and enters personal billing information relating to the credit card. This information is then transmitted electronically to the merchant via a public internet network. Although the transmission is often encrypted, there exists the possibility that the information will be intercepted enroute to the merchant. More likely, however, is that the information will be fraudulently used by an unscrupulous third party, such as a dishonest employee of the merchant, who may be able to assume the identity of the consumer with this information.

For more information on transaction systems, electronic commerce systems, digital wallet systems and loyalty systems, see, for example, the Shop AMEX™ system as disclosed in Ser. No. 60/230,190 filed Sep. 5, 2000; the MR as Currency™ and Loyalty Rewards Systems as disclosed in Ser. No. 60/197,296 filed on Apr. 14, 2000, Ser. No. 60/200,492 filed Apr. 28, 2000, and Ser. No. 60/201,114 filed May 2, 2000; a digital wallet system as disclosed in U.S. Ser. No. 09/652,899 filed Aug. 31, 2000; a stored value card as disclosed in Ser. No. 09/241,188 filed on Feb. 1, 1999; a system for facilitating transactions using secondary transaction numbers as disclosed in Ser. No. 09/800,461 filed on Mar. 7, 2001; and also in related provisional applications Ser. No. 60/187,620 filed Mar. 7, 2000, Ser. No. 60/200,625 filed Apr. 28, 2000, and Ser. No. 60/213,323 filed May 22, 2000, the general technology of all references is hereby incorporated by reference. Other examples of online membership reward systems are disclosed in U.S. Pat. No. 5,774,870, issued on Jun. 30, 1998, and U.S. Pat. No. 6,009,412, issued on Dec. 29, 1999, along with other incentive award programs described in U.S. Pat. Nos. 5,774,870 and 6,009,412, issued to Thomas W. Storey and assigned to Netcentives, the general technology of all references is hereby incorporated by reference. Additional information relating to smart card and smart card reader payment technology is disclosed in Ser. No. 60/232,040, filed on Sep. 12, 2000, and U.S. Pat. Nos. 5,742,845; 5,898,838 and 5,905,908, owned by Datascape; the general technology of all references is hereby incorporated by reference. Information on point-of-sale systems and the exploitation of point-of-sale data is disclosed in U.S. Pat. No. 5,832,457, issued on Nov. 3, 1998 to O'Brien et al., the general technology of which is hereby incorporated by reference.

Accordingly, a need exists for a method and system of facilitating anonymous online purchase transactions. In addition, a need exists for a method and system of facilitating online purchases with a reduced risk of fraud to the consumer.

SUMMARY OF THE INVENTION

This summary of the invention section is intended to introduce the reader to aspects of the invention and is not a complete description of the invention. Particular aspects of the invention are pointed out in other sections hereinbelow, and the invention is set forth in the appended claims which alone demarcate its scope.

In one exemplary embodiment of the present invention, a method for facilitating the anonymous purchase of goods and services by a consumer from an e-commerce website is provided. The method includes providing a plurality of transaction account numbers, wherein each of the transaction account numbers is associated with a monetary load value. The transaction account numbers are stored, in a database which has a plurality of records. Each record corresponds to one of the transaction account numbers. None of the records is configured to store identifying information of a purchaser of one of the transaction numbers. A request for an authorization of a purchase transaction having a purchase value is received from a remote computer terminal, wherein the request is associated with one of the transaction account numbers. The method further includes comparing the purchase value to the monetary load value associated with the transaction account number to determine if the purchase value exceeds the monetary load value. The method further includes authorizing the request for an authorization of a purchase transaction. The purchase value is then subtracted from the monetary load value associated with the transaction account number to obtain an updated monetary load value. The updated monetary load value is then associated with the transaction account number.

In another exemplary embodiment of the invention, a system for facilitating the anonymous purchase of goods and services by a consumer from an e-commerce website includes an account authorization system and a database. The database is configured to store a plurality of transaction account numbers. The database has a plurality of records, each record corresponding to one of the transaction account numbers. None of the records is configured to store identifying information of a purchaser associated with one of the transaction account numbers. The account authorization system is in operative communication with said database and is configured to receive a request for an authorization of a purchase transaction having a purchase value. The request is associated with one of the transaction account numbers.

BRIEF DESCRIPTION OF THE DRAWINGS

The subject invention will hereinafter be described in conjunction with the appended drawing figures, wherein like numerals denote like elements, and.

DETAILED DESCRIPTION OF EXEMPLARY EMBODIMENTS

Figure 1:
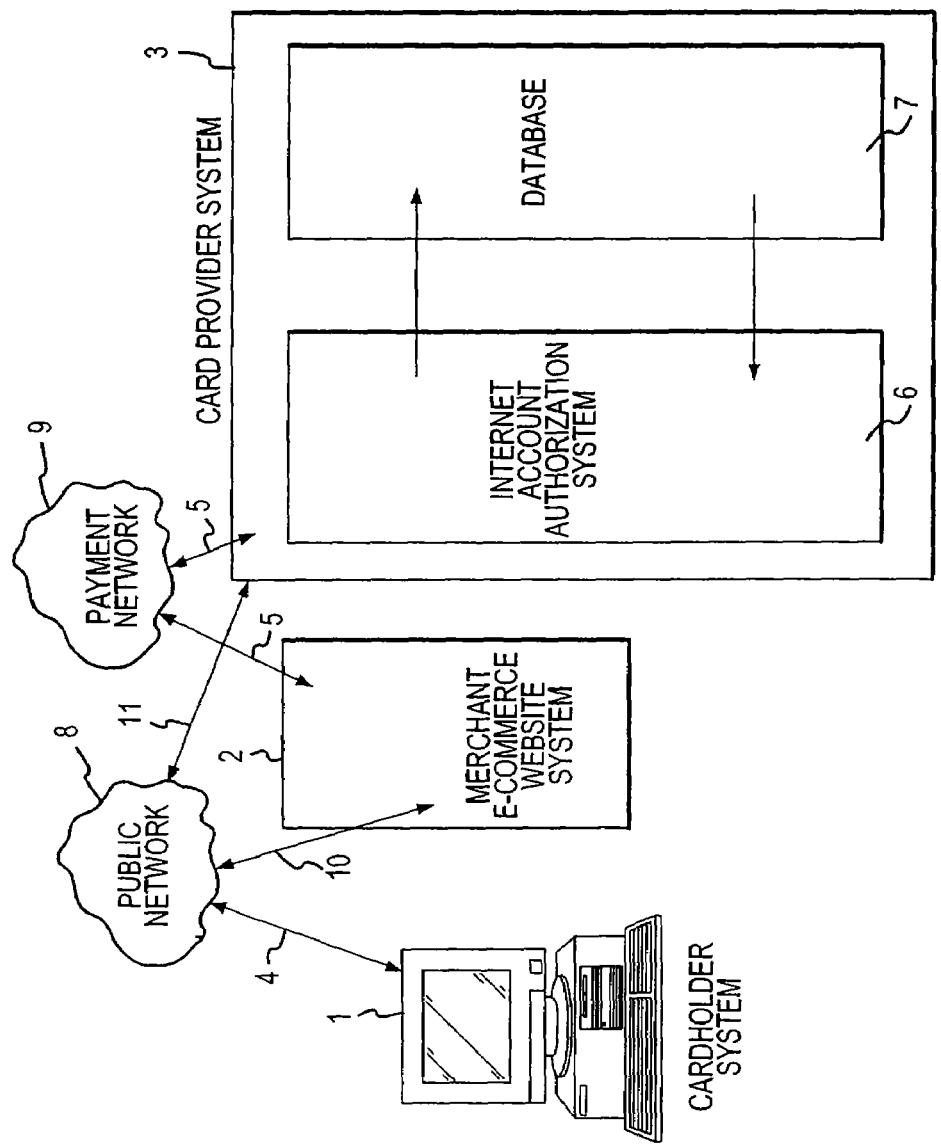
FIG. 1 is a schematic representation of an exemplary embodiment of the present invention.

Systems and methods in accordance with various aspects of the present invention permit purchasers to anonymously purchase goods and services from e-commerce websites without having to have a bank or credit card company affiliation. While the system may contemplate upgrades or reconfigurations of existing processing systems, changes to cardholder or merchant systems are not necessarily required by the present invention. The transaction system herein described can be seamlessly integrated into current electronic commerce processes with minimal to no changes to existing systems used by cardholders or merchants.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, eXtensible Markup Language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography, please review a text written by Bruce Schneider which is entitled "Applied Cryptography: Protocols, Algorithms, And Source Code In C," published by John Wiley & Sons (second edition, 1996), which is hereby incorporated by reference.

Overview of System

The present invention generally relates to a transaction system where a first party to a transaction ("cardholder") provides to a second party to the transaction ("merchant") a transaction account number, referred to herein as an "Internet account number," that was generated by an issuer ("card provider") for use over the Internet. A "transaction," as defined herein, includes any exchange or delivery of value, exchange or delivery of data, gifting of value or data, etc. The term "transaction" not only contemplates an exchange of goods or services for value from one party to another, but also the gifting of something from one party to another. Additionally, transaction numbers are account numbers that are used to facilitate any type of transaction.

An "account number", as used herein, includes any device, code, or other identifier/indicia suitably configured to allow the consumer to interact or communicate with the system, such as, for example, authorization/access code, personal identification number (PIN), Internet code, other identification code, and/or the like which is optionally located on a rewards card, charge card, credit card, debit card, prepaid card, telephone card, smart card, magnetic stripe card, bar code card, paper receipt and/or the like. The account number may be distributed and stored in any form of paper, plastic, electronic, magnetic, and/or optical device capable of transmitting the number to a party to the transaction.

In an exemplary embodiment, the Internet account number has the same industry standard format that is used for regular banking cards (e.g., 15 or 16 digit numbers). It should be appreciated that the number may be, for example, a sixteen-digit number similar to a credit card number, although each card provider has its own number system, such as the fifteen-digit numbering system used by American Express. Each card provider's card numbers comply with that card provider's standardized format such that a card provider using a sixteen-digit format will generally use four spaced sets of numbers, as represented by the number "0000 0000 0000 0000." The first five to seven digits may be reserved for processing purposes and identify the card provider, card type, etc. The intermediary eight-to-ten digits are used to uniquely identify a monetary account. The invention contemplates the use of other numbers, indicia, codes or other security steps in addition to the use of the Internet account number, but in an exemplary embodiment, only the Internet account number is provided to the merchant. In an exemplary embodiment of the invention, although not required, the Internet account number may be immediately usable by the cardholder upon purchase, without the need for activation by the cardholder. In addition, the Internet account number may have associated conditions or parameters of use restrictions which limit use of the Internet account number.

While an exemplary embodiment of the invention is described in association with a transaction system, the invention contemplates any type of networks or transaction systems, including, for example, unsecure networks, public networks, wireless networks, closed networks, open networks, intranets, extranets, and/or the like.

Referencing the computer networked aspect of an exemplary embodiment of this invention, each participant is equipped with a computing system to facilitate online commerce transactions. The computing systems may be connected with each other via a data communication network. The cardholder system and the merchant e-commerce website system may be connected by a public network, which is assumed to be insecure and open to eavesdroppers. In the illustrated implementation, the network is embodied as the Internet. In this context, the computers may or may not be connected to the Internet at all times. For instance, the cardholder system may employ a modem to occasionally connect to the Internet, whereas the merchant e-commerce website system might maintain a permanent connection to the Internet. It is noted that the network may be implemented as other types of networks, such as an interactive television (ITV) network. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The merchant computer system and the card provider computer system may be interconnected via a second network, referred to as a payment network. The payment network represents existing proprietary networks that presently accommodate transactions for credit cards, debit cards, and other types of financial/banking cards. The payment network is a closed network that is assumed to be secure from eavesdroppers. Examples of the payment network include the American Express®, VisaNet® and the Veriphone® networks.

The first party to the transaction, the cardholder, is any individual, business or other entity who uses an Internet account number to facilitate any transaction. Another embodiment contemplates the cardholder gifting an Internet account number to a fourth party to the transaction. The term "cardholder" may also be referred to herein as "consumer," "user," "customer" or the like.

The second party to the transaction, the merchant, is any individual, business, or other entity who receives an Internet transaction number, whether or not in exchange for goods or services. For example, in one embodiment, a merchant may be an online bookstore such as Amazon.com®.

The third party to the transaction, a transaction host, referred to herein as the card provider, includes any provider of products and/or services that facilitates any type of transaction. The card provider establishes and maintains account and/or transaction information associated with the Internet account number. The card provider may issue products to the cardholder and may also provide both the cardholder and the merchant with the processes to facilitate the transaction system of the present invention. The card provider may include banks, credit unions, credit, debit or other transaction-related companies, or any other type of card or account issuing institutions, such as card-sponsoring companies, or third party providers under contract with financial institutions. Unless otherwise specifically set forth herein, although referred to as "card provider," this term should be understood to mean any entity issuing any type of account to facilitate any transaction, exchange or service over the Internet, and should not be limited to companies possessing or issuing physical cards.

Referring now to FIG. 1, a system in accordance with the present invention generally comprises one or more cardholder systems 1 connected via respective data links 4 and 10 to a public network 8 and to a merchant computer system 2 providing an e-commerce website. The merchant computer system 2 in turn is connected via data links 5 to a payment network 9 and to a card provider system 3. The card provider system 3 includes an Internet account authorization system 6 and a database 7. In an alternative embodiment, cardholder system 1 may also be connected to card provider system 3 via data links 4 and 11.

Cardholder system 1 may include any convenient combination of hardware and software components configured to allow a cardholder to communicate with the merchant via the merchant e-commerce website 2 or to communicate with the card provider system 3. For example, cardholder system 1 might include a standard personal computer (PC) comprising a CPU, monitor, storage, keyboard, mouse, and communication hardware appropriate for the given data links 4, 10 and 11, (e.g., V.90 modem, network card, cable modem, etc.). The cardholder system 1 also preferably includes application software configured to communicate over data links 4, 10 and 11, for example, a WWW browser such as Netscape Navigator®, Microsoft Internet Explorer®, or any other present or future communication software which operates in accordance with the HTML or HTTP protocols. As will be appreciated, cardholder system 1 will typically include an operating system (e.g., Windows 95/98/2000, Linux, Solaris, etc.) as well as various conventional support software and drivers typically associated with computers. In an alternative embodiment, cardholder system 1 is a personal data assistant (PDA) capable of communicating with the merchant via the e-commerce website system 2. In yet another embodiment, cardholder system 1 is a kiosk located, for example, at a mall, theme park, airport, or any other location from which a cardholder might wish to purchase goods or services over the Internet.

A variety of conventional communications media and protocols may be used for data links 4, 10 and 11. Such links might include, for example, a connection to an Internet Service Provider (ISP) over the local loop as is typically used in connection with standard modem communication, cable modem, Dish networks, ISDN, Digital Subscriber Line (xDSL), or various wireless communication methods. Cardholder system 1 might also reside within a local area network (LAN) which interfaces to merchant e-commerce website 2 and card provider system 3 via a leased line (T1, DS3, etc.). Such communication methods are well known in the art, and are covered in a variety of standard texts. See, e.g., GILBERT HELD, UNDERSTANDING DATA COMMUNICATIONS (1996), hereby incorporated by reference.

As the present invention is best deployed in the context of a large user-base, the cardholder system 1 preferably is in communication with the Internet. As used herein, the term Internet refers to the global, packet-switched network utilizing the TCP/IP suite of protocols. Nevertheless, the present invention may be implemented in other network contexts, including any future alternatives to the Internet, as well as other suitable internetworks based on other open or proprietary protocols.

The merchant e-commerce website system 2 may include any combination of hardware, software, and networking components configured to transmit, receive and process transaction-related data to and from the cardholder system 1 and transmit, receive and process transaction-related data to and from card provider system 3. In addition, merchant e-commerce website system 2 provides a suitable website or other Internet-based graphical user interface which is accessible by cardholders. The term website as it is used herein is not meant to limit the type of documents and applications that might be used to interact with a cardholder. For example, a typical website might include, in addition to standard HTML documents, various forms, Java applets, Javascript, active server pages (AS), common gateway interface scripts (CGI), extensible markup language (XML), dynamic HTML, cascading style sheets (CSS), helper applications, plug-ins and the like.

The Internet account authorization system ("IAAS") 6 of card provider system 3 includes any combination of hardware and software components configured to transmit, receive and process transaction-related data to and from the merchant e-commerce website system 2, and to interrogate database 7. Database 7 is a relational database comprising various records for managing and translating a variety of information, such as Internet account numbers, transaction data, conditions/rules, etc. In an exemplary embodiment, database 7 has a plurality of records. Each record is associated with an Internet account number, which is stored in a field of the record. In addition to a field for storing an Internet account number, each record includes a field for storing a monetary value associated with the Internet account number. The record may also contain a field for indicating whether the account number has been reported lost or stolen, a field indicating the expiration date of the Internet account number, and a field indicating rules or conditions for use of the Internet account number. Because the system of the present invention is directed to permitting anonymous transactions over the Internet, in one embodiment of the invention the records of the database that are associated with Internet account numbers do not store identifying information of the purchasers or users of the Internet account numbers. As used herein, "identifying information" of the cardholder may include name, address, social security number, credit card or debit card numbers or any other information that can be used to obtain the identity of a cardholder. Records in the database that are associated with account numbers other than Internet account numbers may store identifying information of purchasers of those account numbers.

In an alternate embodiment, the records of the database that are associated with Internet account numbers may store identifying information of purchasers or users of the Internet account numbers but the card provider system 3 is not configured to provide such identifying information to persons, entities or systems that are not associated with or affiliated with card provider system 3. For example, while the records that are associated with Internet account numbers may store the names and/or addresses of purchasers or users of the Internet account numbers, card provider system 3 does not distribute such information to merchants or other third-party entities such as banks, credit bureaus or the like. Accordingly, the identity of the Internet account number purchasers and users remains anonymous.

The systems of the present invention may include a host server or other computer systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. Database 7 may be any type of database, such as relational, hierarchical, object-oriented, and/or the like. Common database products that may be used to implement database 7 include DB2 by IBM (White Plains, N.Y.), any of the database products available from Oracle Corporation (Redwood Shores, Calif.), Microsoft Access by Microsoft Corporation (Redmond, Wash.), or any other database product. Database 7 may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Purchase of Internet Account Number

Figure 2:
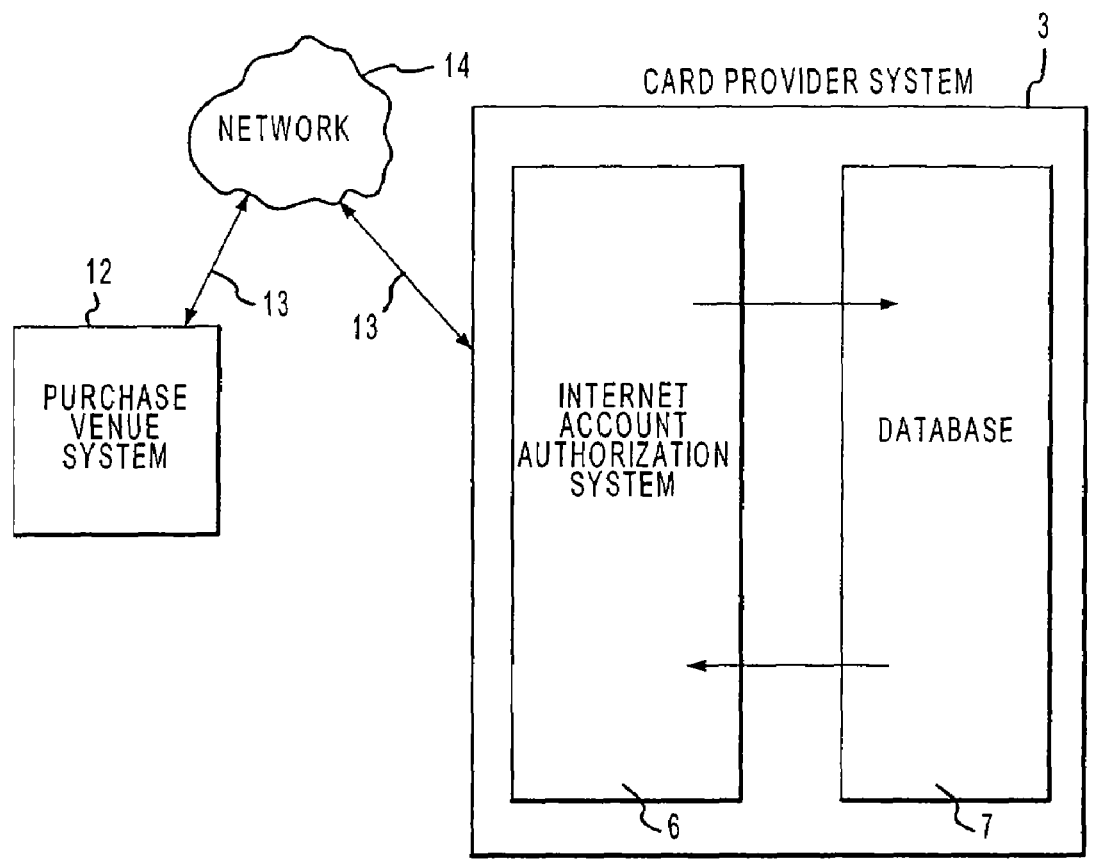
FIG. 2 is a schematic representation of another exemplary embodiment of the present invention.

Referring now to FIG. 2, an exemplary method for purchasing an Internet account number will now be described. A purchase venue system 12 may be a vending machine, an ATM or any other automated computer system in communication with a computer network but is preferably a point-of-sale ("POS") terminal located at a retail establishment (e.g., gasoline stations, convenience stores, etc.). Alternatively, the purchase venue system may be a purchaser's PC, PDA or telephone which is in communication with the card provider system 3. Purchase venue system 12 is in communication with card provider system 3 via data links 13 of a network 14 such as a payment network described above. The payment network represents existing proprietary networks that presently accommodate transactions for credit cards, debit cards, and other types of financial/banking cards. The payment network is a closed network that is assumed to be secure from eavesdroppers. Examples of the payment network include the American Express®, VisaNet® and the Veriphone® networks.

In one exemplary embodiment, a plurality of cards are printed with each card having an Internet account number printed, embossed, encoded or the like onto the card (hereinafter, "Internet card"). Preferably, the Internet cards are of the same size and shape as standard credit cards, debit cards and stored value cards. The Internet cards may have a magnetic stripe that stores or accesses the Internet account number and also may have the Internet account number printed on the card. Alternatively, the Internet cards may be printed with an identification number that corresponds to an Internet account number so that the Internet account number is not viewable or derivable from the card.

Alternatively, upon purchase of an Internet account number, as described in more detail below, the Internet account number may be provided to the purchaser/cardholder by mechanisms other than physical cards. For example, the Internet account number may be printed on a paper receipt which is printed and given to the purchaser/cardholder by the purchase venue system 12. Alternatively, if the purchase venue system 12 is the PC or PDA of a purchaser/cardholder, the Internet account number can be transmitted to the display screen of the PC or PDA to be downloaded, printed out or written down by the purchaser/cardholder. If the purchase venue system 12 is a telephone, the Internet account number may be vocalized either automatically or by a service representative so that the purchaser/cardholder can record the Internet account number for later use.

The Internet account numbers may be distributed in a non-active state to retailers having purchased venue systems 12. Accordingly, until activated, the Internet account numbers have no monetary value and the potential of fraud due to theft of the Internet cards while being distributed to or stored at the retailers is reduced. In an alternative embodiment, the Internet account numbers may be distributed to retailers in an active but non-funded state. In another alternative embodiment, the Internet account numbers may be distributed in an activated and funded state. Such activated and funded cards may be distributed by retailers, for example, as promotional gift items. To reduce the risk of theft or fraud, the Internet account numbers may be funded for a nominal amount, such as, for example, $5 or $10. In addition, the Internet account numbers may be activated for a relatively short period of time, such as, for example, one or two months.

In an exemplary embodiment of the invention, with continued reference to FIG. 2, database 7 of the card provider system 3 has a plurality of records, each record having a plurality of fields. The database may have only records that are associated with Internet account numbers or may have records associated with other account numbers in addition to records associated with the Internet account numbers. Each record associated with an Internet account number has stored in a field an Internet account number similar to, or derivable from, the number which has been printed, embossed, encoded or the like on an Internet card. Each such record also has a field for storing a monetary value associated with the Internet account number. Upon generation of the Internet account number, the monetary value associated with the Internet account number is zero. Each record also may have a field that indicates whether the Internet account number is activated or non-activated. In addition, each record may have a field that indicates whether the Internet account number has been reported lost or stolen, a field indicating the expiration date of the Internet account number, a field that stores a code indicating whether the monetary value has been reloaded, a field indicating the retailer to whom the Internet card was shipped and the date it was shipped, and a field for storing data regarding redemption and transaction history. The record may further include any additional fields for storing information relating to the transaction history of the Internet account number.

In an alternative embodiment of the invention, each Internet account number may be predenominated. If the Internet account number is predenominated, the record also has a field that indicates the amount of predenomination, for example, $20, $50, $100, etc. The cardholder pays the predenominated amount for the associated Internet account number, and any additional processing fees charged by the merchant or card provider or any other taxes. In another embodiment, if the Internet account number can be re-loaded, as described below, the predenominated amount may represent the maximum monetary amount that can be loaded to the Internet account number.

In another embodiment, the record may have fields identifying limited-use (or conditions-of-use) parameters placed upon the Internet account number by either the cardholder, the merchant or the card provider. Parameters may include, for example: (1) use of the Internet account number for only a predetermined number of transactions; (2) cardholder-determined expiration date; (3) limiting use of the Internet account number to a specified dollar amount per transaction, maximum dollar amount per month, etc.; (4) use of the Internet card for a specified merchant only; or (5) any combination of these parameters.

Figure 3:
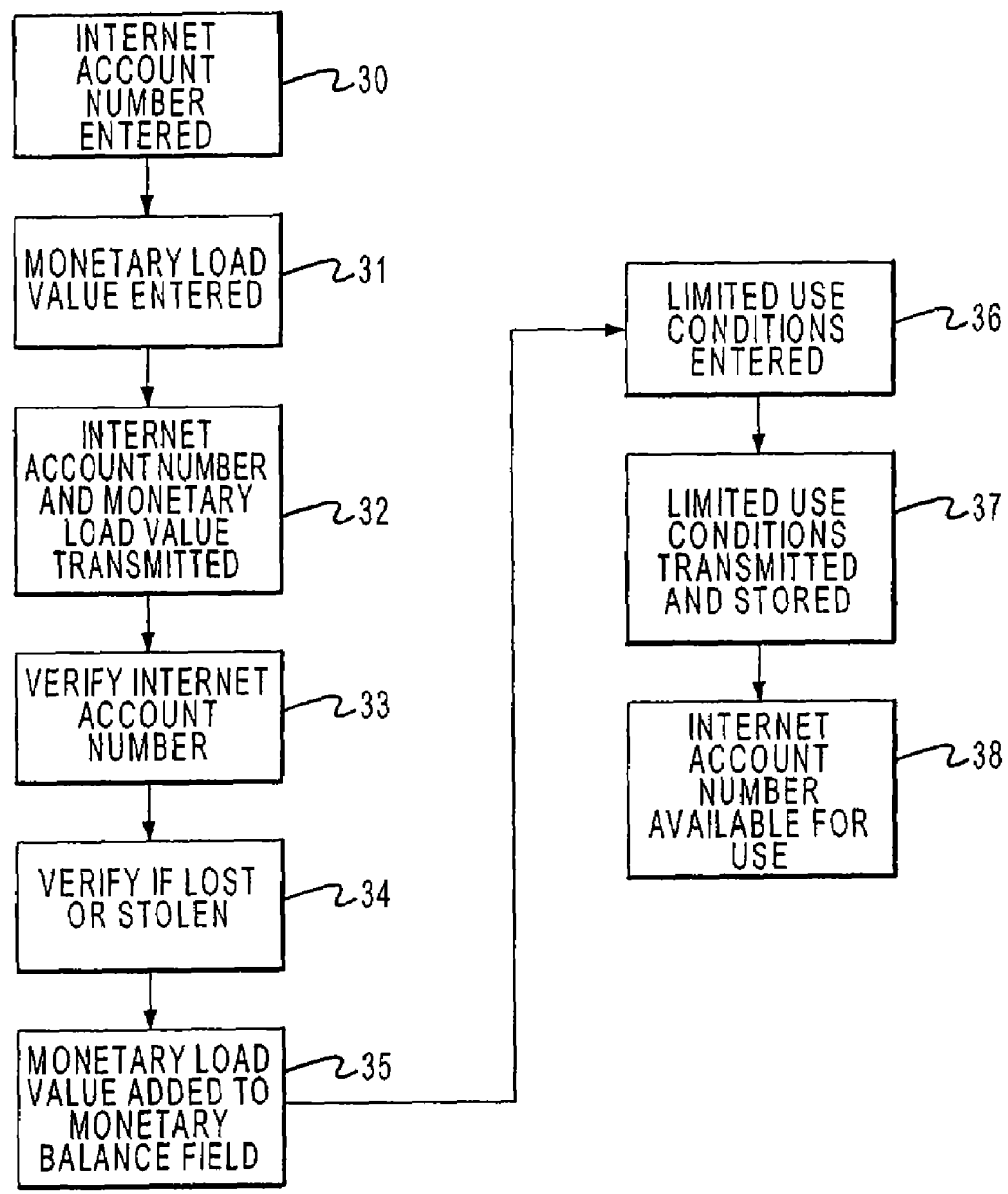
FIG. 3 is a flow diagram of an exemplary process of the present invention.

With continued reference to FIG. 2, and with reference to FIG. 3, when a cardholder/purchaser purchases an Internet card at a retailer, the retailer or the purchaser may swipe the card through the purchase venue system 12, such as a POS terminal, which reads the Internet account number from the magnetic stripe on the card (Step 30). Alternatively, the retailer or purchaser may manually enter the Internet account number from the keyboard of the POS terminal or telephone the information into a location to obtain a verbal authorization. The retailer or purchaser may then input into the purchase venue system the purchaser's requested monetary load value to be loaded to the Internet card (Step 31). The Internet card number and monetary load value information are then transmitted over data links 13 to the Internet account authorization system (IAAS) 6 (Step 32). The IAAS 6 interrogates the database to find a record associated with an Internet account number that matches the transmitted Internet account number (Step 33).

If no Internet account number is located in the database 7 that matches the transmitted Internet account number, the IAAS 6 transmits a message to the purchase venue system via data links 13 informing the retailer that activation of the Internet card has been denied. If an Internet account number in database 7 matches the transmitted Internet account number, the IAAS 6 interrogates the record associated with the Internet account number to determine if the Internet account number has been reported lost or stolen (Step 34). If the Internet account number has been reported as lost or stolen, the IAAS 6 transmits a message to the purchase venue system via data links 13 informing the retailer that activation of the Internet card has been denied. The message may also direct the retailer to confiscate the Internet card and return it to the card provider or otherwise.

If the Internet account number has not been reported lost or stolen, the monetary load value requested by the cardholder/purchaser is added to the monetary value field (Step 35). The cardholder/purchaser may then be requested to place any limited-use or conditions-for-use parameters on the Internet card (Step 36). These parameters are transmitted from the purchase venue system 12 to the IAAS 6 and stored in database 7 (Step 37). Alternatively, the parameters may be transmitted to the IAAS 6 with the Internet account number and monetary load amount. The IAAS 6 may then transmit a message to the purchase venue system 12 indicating that the Internet account number is available for use (Step 38). The retailer, either before or after the load process, may accept cash, credit or debit card or other form of payment from the cardholder/purchaser equal to the monetary load value loaded to the card and any other processing fees required by the merchant or the card provider. In one embodiment of the invention, as the system of the present invention permits anonymous purchasing of goods or services, no identifying information must be provided by the cardholder/purchaser to purchase an Internet account number. In another embodiment of the invention, identifying information may be provided by the cardholder/purchaser but such information is not disclosed to third parties by card provider system 3.

Alternatively, if, for example, purchase venue system 12 is the PC, PDA, telephone, or the like of a cardholder/purchaser, a request to purchase an Internet account number may be transmitted to card provider system 3, unaccompanied by an Internet account number. For example, the cardholder/purchaser may access a website or telephone number of the card provider and, when prompted, may request the purchase of an Internet account number, which request is transmitted to card provider system 3 over data links 13. The IAAS 6 interrogates the database to locate an Internet account number that has not been previously purchased.

The cardholder/purchaser may then be prompted by card provider system 3 to enter the monetary load value to be loaded to the Internet account number. Alternatively, the monetary load value may be transmitted to card provider system 3 with the request to purchase the Internet account number. Upon receipt of the monetary load amount, IAAS 6 stores the monetary load value in a suitable field of the record associated with the Internet account number in database 7. The cardholder/purchaser may then be requested to place any limited-use or conditions-for-use parameters on the Internet account number. The parameters are transmitted to card provider system 3 and stored in database 7. The cardholder/purchaser may then be prompted to enter a credit or debit card number or other suitable form of payment to cover the monetary load value loaded to the card and any other processing fees required by the card provider. The IAAS 6 may then transmit to the cardholder/purchaser the Internet account number, which is ready for use.

Using the Internet Card For Transactions Over the Internet

Figure 4:
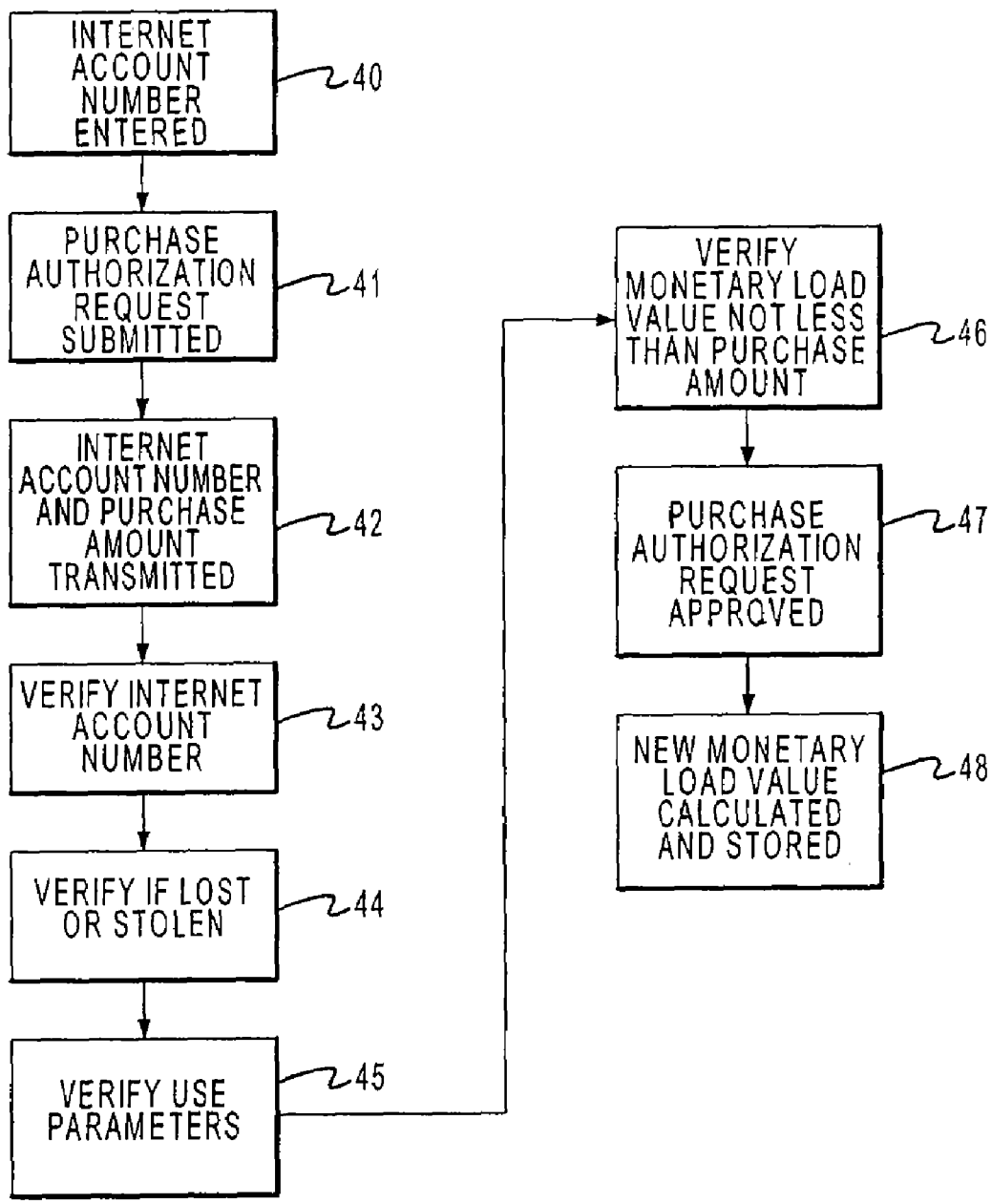
FIG. 4 is a flow diagram of another exemplary process of the present invention.

Referring to FIGS. 1 and 4, when conducting a purchase over the Internet using the Internet card, the cardholder, using the cardholder system 1, accesses a merchant e-commerce website system 2 via data links 4 and 10, which permit viewing of the merchant's website pages at the cardholder system 1. While viewing the merchant's website pages, the customer selects the item(s) or services to be purchased and then accesses the payment page. When prompted by the retailer's website to indicate form of payment, the user selects the appropriate button on the browser or the icon on the display. Preferably, the website is configured to permit the cardholder to select a button associated with the card provider. For example, if the card provider is American Express®, the website is configured to permit the cardholder to select a button which permits payment via an American Express credit card. Alternatively, the website may be configured to permit the cardholder to select a button associated with any credit card or debit card company. A pop-up window appears asking the cardholder to enter a credit card number. The cardholder then enters the Internet account number rather than a credit card number (Step 40). In addition, the merchant website may prompt the cardholder to enter the expiration date of the credit card, where upon the cardholder may enter the expiration date of the Internet account number. As discussed above with the incorporated references and examples, the input of information may be achieved via keyboard entry, real-time generation of the account number, digital wallet, swiping the card through a reader (smart card, bar code, magnetic stripe, etc.) and/or the like. While the merchant website may prompt the cardholder to enter the name of the recipient of the product(s) or service(s) and the shipping address for purposes of delivering the product(s) or service(s) and for marketing purposes, no identifying information of the cardholder is required to be supplied to allow a purchase using the Internet card and no such identifying information is transmitted by the card provider system 3. Moreover, the merchant cannot trace the Internet card and corresponding Internet account number to a specific owner. Accordingly, the Internet card is configured to maintain the complete or substantially complete anonymity of the card owner.

After the cardholder has supplied all information requested by the merchant website, the merchant e-commerce website system 2 submits a purchase authorization request with the cardholder's Internet account number to the card provider 3, as it would with any other credit card transaction (Step 41). The merchant transmits to the IAAS 6 the cardholder's Internet account number and the purchase amount of the transaction requested by the cardholder (Step 42). This request is routed to the IAAS 6 for authorization. As discussed above, the Internet account number includes numbers or codes that permit payment network 9 to identify the card provider and transmit the purchase authorization request to the appropriate card provider system.

The IAAS 6 then interrogates the database to find a record associated with an Internet account number that matches the cardholder's transmitted Internet account number (Step 43). If no Internet account number that matches the cardholder's transmitted Internet account number is located in the database 7, the IAAS 6 transmits a message to the merchant e-commerce website system via data links 5 informing the retailer that the purchase authorization request has been denied. If an Internet account number that matches the cardholder's transmitted Internet account number is located in the database 7, the IAAS 6 interrogates the record associated with the Internet account number to determine if the Internet account number corresponding to the Internet card has been reported lost or stolen (Step 44). If the Internet account number has been reported as lost or stolen, the IAAS 6 transmits a message to the merchant e-commerce website via data links 5 informing the retailer that the purchase authorization request has been denied. The IAAS 6 also interrogates the expiration date stored in the database 7 to determine if the Internet account number has expired. If the Internet account number has expired, the IAAS 6 transmits a message to the merchant e-commerce website via data links 5 informing the retailer that the purchase authorization request has been denied. In addition, the IAAS 6 may interrogate the database to determine if use of the Internet card has satisfied any use-limitations parameters (Step 45). Alternatively, if the Internet card is a smart card, the use-limitations parameters may be transmitted with the Internet account number and the IAAS 6 may analyze the transmitted parameters to determine if they have been satisfied. If any of the parameters have not been satisfied, the IAAS 6 may transmit a message to the merchant e-commerce website system 2 via data links 5 informing the merchant that the purchase authorization request has been denied.

If the Internet account number has not been reported lost or stolen, has not expired, and all use-limitations parameters have been satisfied, the IAAS 6 may then compare the purchase amount of the transaction to the monetary load value associated with the Internet account number (Step 46). If the purchase amount exceeds the monetary load value, the IAAS 6 transmits a message to the merchant e-commerce website system 2 via data links 5 informing the retailer that the purchase authorization has been denied. Alternatively, the IAAS 6 may transmit a message to the merchant e-commerce website system 2 indicating the monetary load value associated with the Internet account number so that the cardholder is able to cover the difference between the purchase amount and the monetary load value with a credit or debit card or other form of payment. Alternatively, the system may allow the cardholder to load additional value onto the card sufficient for the transaction to proceed.

If the purchase amount is equal to or less than the monetary load value associated with the Internet account number, the purchase transaction associated with the Internet account number is approved and the IAAS 6 transmits a message granting the purchase authorization request to the merchant e-commerce system 2 (Step 47). The IAAS 6 then deducts the purchase amount from the monetary load value stored in the database to obtain a new monetary load value and stores this new amount in the monetary value field associated with the Internet account number (Step 48). The merchant is subsequently paid the purchase amount by the card provider by typical settlement procedures well known in the financial industry. One skilled in the art will appreciate that any of the above steps may be optional or preformed in any order. Moreover, the order of the approval steps may be predetermined generally or pre-established for each account number depending on certain rules.

Using the Internet Card for Transactions at a Retail Establishment

In another alternative embodiment of the invention, the Internet card may be used not only to purchase goods and services over a computer network, such as the Internet, but may also be used to purchase goods and services from a "brick and mortar" retailer. Such a transaction employs a process similar to that illustrated in FIG. 4. The invention contemplates that a retailer may have, for example, a kiosk or customer computer in the retail location and the transaction may occur similar to the steps set forth above. When purchasing goods or services from a retailer, the cardholder presents the Internet card to the retailer. The retailer or cardholder swipes the card through a computer terminal, such as a POS terminal, or, alternatively, manually enters the Internet account number via a keyboard attached to the computer terminal. The retailer then transmits a purchase authorization request with the Internet account number and the purchase amount to the card provider system 3, as it would with any other credit card transaction. As discussed above, the Internet account number includes numbers or codes that permit payment network 9 to identify the card provider and transmit the purchase authorization request to the appropriate card provider system. The request is routed to the IAAS 6 for authorization via data links 5. The IAAS 6 then interrogates the database to find a record associated with an Internet account number that matches the cardholder's Internet account number on the Internet card.

If no Internet account number that matches the cardholder's Internet account number is located in the database 7, the IAAS 6 transmits a message to the retailer's POS terminal informing the retailer that purchase authorization request has been denied. If an Internet account number that matches the cardholder's Internet account number is located in the database 7, the IAAS 6 interrogates the record associated with the Internet account number to determine if the Internet account number corresponding to the Internet card has been reported lost or stolen. If the Internet account number has been reported as lost or stolen, the IAAS 6 transmits a message to the retailer informing the retailer that the purchase authorization request has been denied. The message may also direct the retailer to confiscate the Internet card and return it to the card provider. The IAAS 6 also interrogates the expiration date stored in the database 7 to determine if the Internet account number has expired. If the Internet account number has expired, the IAAS 6 transmits a message to the retailer informing the retailer that the purchase authorization request has been denied. In addition, the IAAS 6 may interrogate the database to determine if use of the Internet card has satisfied any use-limitations parameters. If any of the parameters have not been satisfied, the IAAS 6 may transmit a message to the retailer informing the retailer that the purchase authorization request has been denied.

If the Internet account number has not been reported lost or stolen, has not expired and all use-limitations parameters have been satisfied, the IAAS 6 may then compare the purchase amount of the transaction to the monetary load value associated with the Internet account number. If the purchase amount exceeds the monetary load value, the IAAS 6 transmits a message to the retailer via the POS terminal informing the retailer that the purchase authorization has been denied. Alternatively, the IAAS 6 may transmit a message to the retailer indicating the monetary load value associated with the Internet account number so that the cardholder is able to cover the difference between the purchase amount and the monetary load value with cash, a credit or debit card or other form of payment or is able to reload the Internet card account with more funds.

If the purchase amount is equal to or less than the monetary load value associated with the Internet account number, the purchase transaction associated with the Internet account number is approved and the IAAS 6 transmits a message granting the purchase authorization request to the retailer. The IAAS 6 then deducts the purchase amount from the monetary load value stored in the database to obtain a new monetary load value and stores this new amount in the monetary load value field associated with the Internet account number. The retailer is subsequently paid the purchase amount by the card provider by typical settlement procedures well known in the financial industry. One skilled in the art will appreciate that any of the above steps may be optional or performed in any order. Moreover, the order of the approval steps may be predetermined generally or pre-established for each account number depending on certain rules.

Checking Balance of the Internet Account Number

In another embodiment of the invention, referring again to FIG. 1, the cardholder may check the monetary value associated with an Internet account number using the cardholder system 1. In this embodiment, card provider system 3 provides a suitable website or other Internet-based graphical user interface that is accessible by cardholders. Using the cardholder system 1, the cardholder accesses the card provider website through public network 8 via data links 4 and 11. The website is configured to permit the cardholder to request a balance inquiry and to prompt the cardholder to enter an Internet account number. The input of the Internet account number may be achieved via keyboard entry, real-time generation of the account number, digital wallet, swiping the Internet card through a reader (smart card, bar code, magnetic stripe, etc.) and/or the like.

Once the cardholder has requested a balance inquiry and entered the Internet account number, the Internet account number is transmitted to the IAAS 6 of the card provider system 3.

The IAAS 6 then interrogates database 7 to find a record associated with an Internet account number that matches the cardholder's transmitted account number. If no Internet account number that matches the cardholder's transmitted Internet account number is located in the database 7, the IAAS 6 transmits a message to cardholder system 1 via data links 4 and 11 and public network 8 informing the cardholder that the balance inquiry request is denied. If an Internet account number that matches the cardholder's transmitted Internet account number is located in database 7, the IAAS 6 interrogates the record associated with the Internet account number to determine if the Internet account number corresponding to the Internet card has been reported lost or stolen. If the Internet account number has been reported lost or stolen, the IAAS 6 transmits a message to cardholder system 1 informing the cardholder that the balance inquiry request is denied. If the Internet account number has not been reported lost or stolen, then the IAAS 6 interrogates the record associated with the Internet account number to find the monetary load value. The IAAS 6 then transmits the monetary load value to the cardholder via data links 4 and 11 and public network 8 so it may be viewed by the cardholder on the card provider website.

In a further embodiment of the invention, the card provider system 3 may give the cardholder the option of reloading the Internet account number using the card provider website, as described more fully below.

In another exemplary embodiment of the invention, the cardholder may check the monetary value associated with an Internet account number using a telephone. In this embodiment, the cardholder telephones the card provider and speaks to a telephone service representative or, alternatively, an automatic answering system. The cardholder requests a balance inquiry from the telephone service representative and provides the telephone service representative with an Internet account number. The telephone service representative then transmits a balance inquiry request and the Internet account number to the card provider system 3. The request is received by the IAAS 6 of the card provider system 3, which interrogates the database 7 to locate an Internet account number that matches the cardholder's Internet account number. If no Internet account number that matches the cardholder's Internet account number is located in the database 7, the IAAS 6 transmits a message to the telephone service representative indicating that the balance inquiry request is denied.

If an Internet account number that matches the cardholder's Internet account number is located in database 7, the IAAS 6 interrogates the record associated with the Internet account number to determine if the Internet account number has been reported lost or stolen. If the Internet account number has been reported lost or stolen, the IAAS 6 transmits a message to the telephone service representative indicating that the balance inquiry request is denied. If the Internet account number has not been reported lost or stolen, then the IAAS 6 interrogates the record associated with the Internet account number to find the monetary load value. The IAAS 6 then transmits the monetary load value to the telephone service representative, who then provides the monetary load value to the cardholder.

In a further embodiment of the invention, the telephone service representative may give the cardholder the option of reloading the Internet account number, as described more fully below.

Reloading the Internet Account Number

If, after purchase of an Internet card, the cardholder desires to reload the card to add additional funds to the card, the cardholder may do so at a "brick and mortar" retailer. Alternatively, as explained in more detail below, the cardholder may load the Internet card over the telephone, ATM or via the Internet.

Figure 5:
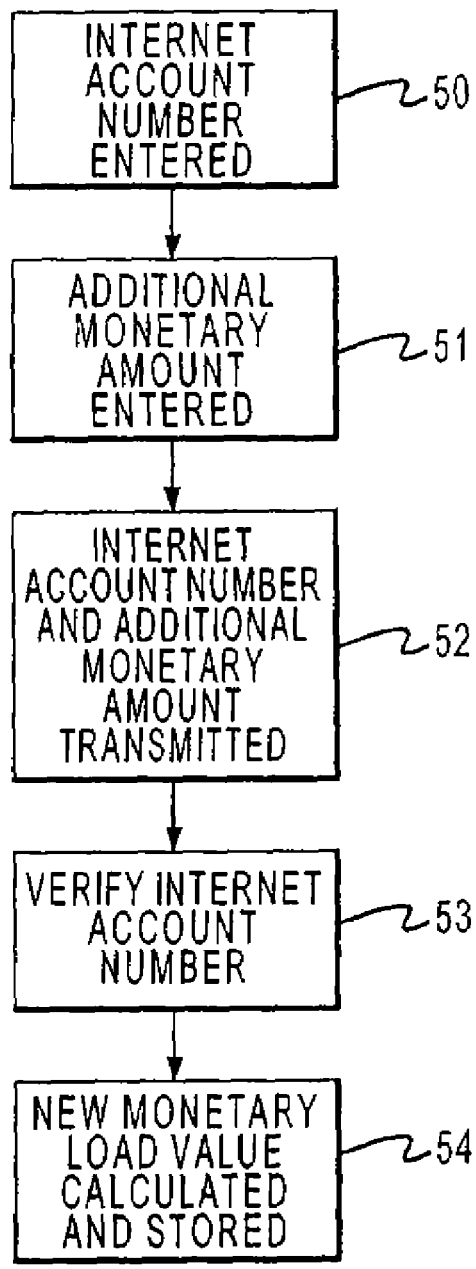
FIG. 5 is a flow diagram of yet another exemplary process of the present invention.

As illustrated in FIG. 5, at a retail establishment, the Internet card is swiped through a computer terminal, such as a POS terminal, which reads the Internet account number from the magnetic stripe on the card (Step 50). Alternatively, the cardholder or retailer may manually input the Internet account number into the terminal via a keyboard connected to the terminal. The cardholder or retailer then inputs the additional monetary amount requested by the cardholder to be added to the Internet card (Step 51). The Internet account number and additional monetary amount are then transmitted to the card provider system 3 via a request for a reload authorization (Step 52). The request is received by the IAAS 6 of the card provider system, which interrogates the database 7 to locate an Internet account number that matches the account number printed or encoded on the cardholder's Internet card (Step 53).

If no Internet account number that matches the cardholder's Internet account number is located in the database 7, the IAAS 6 transmits a message to the retailer's POS terminal informing the retailer that reloading authorization request has been denied. If an Internet account number that matches the cardholder's Internet account number is located in database 7, the IAAS 6 interrogates the database to ensure that the Internet account number has not expired and that any stored use-limitations parameters do not prohibit reloading. If the Internet account number has expired or if any use-limitations preclude reloading, the IAAS 6 transmits a message to the retailer's POS terminal denying the reloading authorization request. If the Internet account number has not expired and no use-limitations prohibit reloading, the IAAS 6 adds the additional monetary amount to the monetary load value associated with the Internet account number to obtain a new monetary load value and then stores the new monetary load value in the monetary value field associated with the Internet account number. The retailer then accepts cash, credit card, debit card or other charge card, or other form of payment to cover the additional monetary amount to be loaded to the card and any other processing fees. The retailer subsequently pays the additional monetary amount to the card provider by typical settlement procedures well known in the financial industry.

If the cardholder desires to reload the Internet card over the telephone, the cardholder telephones the card provider and speaks to a telephone service representative or, alternatively, an automatic answering system. The telephone service representative requests the Internet account number and the additional monetary amount to be added to the card from the cardholder and transmits a request for authorization to reload the card, which request is accompanied by the Internet account number and additional monetary amount, to the card provider system 3. The request is received by the IAAS 6 of the card provider system 3, which interrogates the database 7 to locate an Internet account number that matches the account number on the cardholder's Internet card. If no Internet account number that matches the cardholder's Internet account number is located in the database 7, the IAAS 6 transmits a message to the telephone service representative indicating that the reloading authorization request has been denied.

If an Internet account number that matches the cardholder's Internet account number is located in database 7, the IAAS 6 interrogates the database as described above to determine if the Internet account number has expired or if use-limitations prohibit reloading. If the Internet account number has not expired and no use-limitations prohibit reloading, the IAAS 6 adds the additional monetary amount to the monetary load value associated with the Internet account number to obtain a new monetary load value and then stores the new monetary load value in the monetary value field associated with the Internet account number. The IAAS 6 then sends a message to the telephone service representative authorizing the reload transaction. The telephone service representative then accepts a credit card, debit card or other charge card number from the cardholder to cover the additional monetary amount to be loaded to the card and any other processing fees.

In yet another embodiment of the invention, the cardholder may reload the Internet card via an ATM, PDA or Internet website. The cardholder may input the Internet card into the appropriate port of the ATM, PDA or PC, or alternatively, may manually enter the Internet account number via a keyboard. When suitably prompted, the cardholder may then input the additional monetary amount to be added to the card. The ATM, PDA or PC transmits a request for authorization to reload the card, which request is accompanied by the Internet account number and additional monetary amount, to the card provider system 3. The request is received by the IAAS 6 of the card provider system 3, which interrogates the database 7 to locate an Internet account number that matches the account number on the cardholder's Internet card.

If no Internet account number that matches the cardholder's Internet account number is located in the database 7, the IAAS 6 transmits a message to the ATM, PDA or PC indicating that the reloading authorization request has been denied. If the Internet account number that matches the cardholder's Internet account number is located in database 7, the IAAS 6 interrogates the database described above to determine if the Internet account number has expired or if any use-limitations prohibit reloading. If the Internet account number has not expired and no use-limitations prohibit reloading, the IAAS 6 adds the additional monetary amount to the monetary load value associated with the Internet account number to obtain a new monetary load value and then stores the new monetary load value in the monetary value field associated with the Internet account number. The IAAS 6 then sends a message to the ATM, PDA or PC authorizing the reload transaction. The cardholder may then input into a suitable port in the ATM, PDA or PC a credit card, debit card or charge card from which funds can be drawn to cover the additional monetary amount and any other processing fees. Alternatively, the cardholder may manually enter a credit card, debit card or charge card number via a keyboard.

Figure 6:
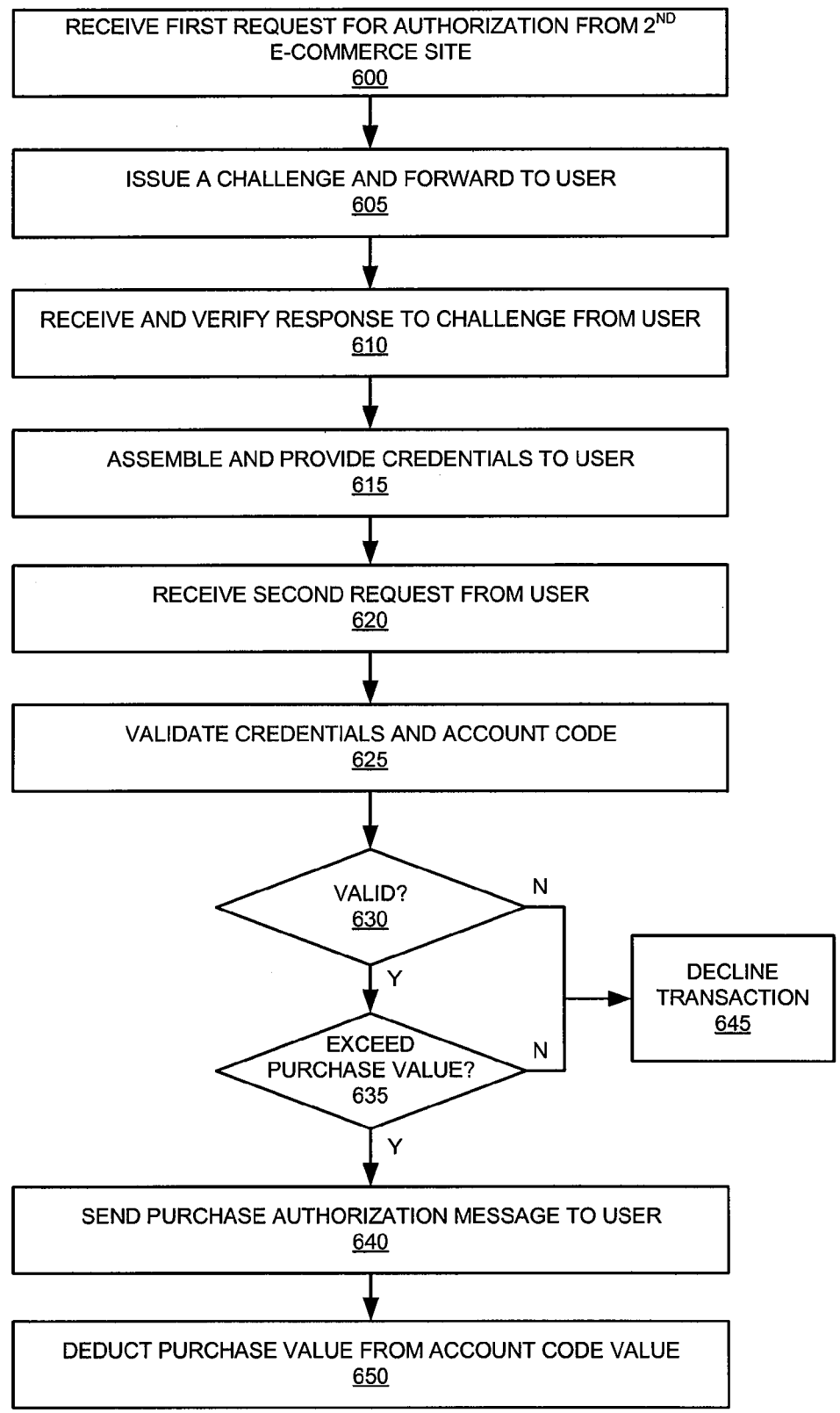
FIG. 6 is a flow diagram of a process for facilitating an anonymous purchase over the Internet in accordance with an embodiment of the present invention.

With reference to FIG. 6 and in accordance with one embodiment, card provider system 3 receives an authorization request for an authorization of a purchase transaction, via a user at a second e-commerce website (step 600). The authorization request is associated with an account code that is issued by a first e-commerce web site for use on the second e-commerce website. In response to the authorization request, card provider system 3 issues a challenge and forwards the challenge to the user (step 605). The challenge is passed to an intelligent token for processing and the intelligent token generates a response to the challenge. Card provider system 3 receives and processes the response from the user and verifies the intelligent token (step 610). Card provider system 3 assembles credentials for the authorization request (wherein the credentials include at least one key) and provides the assembled credentials to the user (step 615).

When card provider system 3 receives a second request including a portion of the assembled credentials from the user (step 620), the server validates the portion of the assembled credentials with the key that corresponds to the assembled credentials (step 625). This provides the user access to purchase the account code. If the portion of the assembled credentials is not valid (step 630), then the request is declined (step 645). Otherwise, card provider system 3 determines if the account code is equal to one of a plurality of valid account codes. When the account code is equal to one of the plurality of valid account codes, card provider system 3 compares the purchase value to the monetary value that is associated with the account code to determine if the monetary value exceeds the purchase value. If the account code is not equal to one of the plurality of valid account codes or when the monetary value does not exceed the purchase value (step 635), the request is declined (step 645). When the monetary value exceeds the purchase value (step 635), card provider system 3 sends a purchase authorization message authorizing the purchase transaction (step 640) and subtracts the purchase value from the monetary value associated with the account code (step 650) in order to obtain an updated monetary value, which is associated with the account code.

Figure 7:
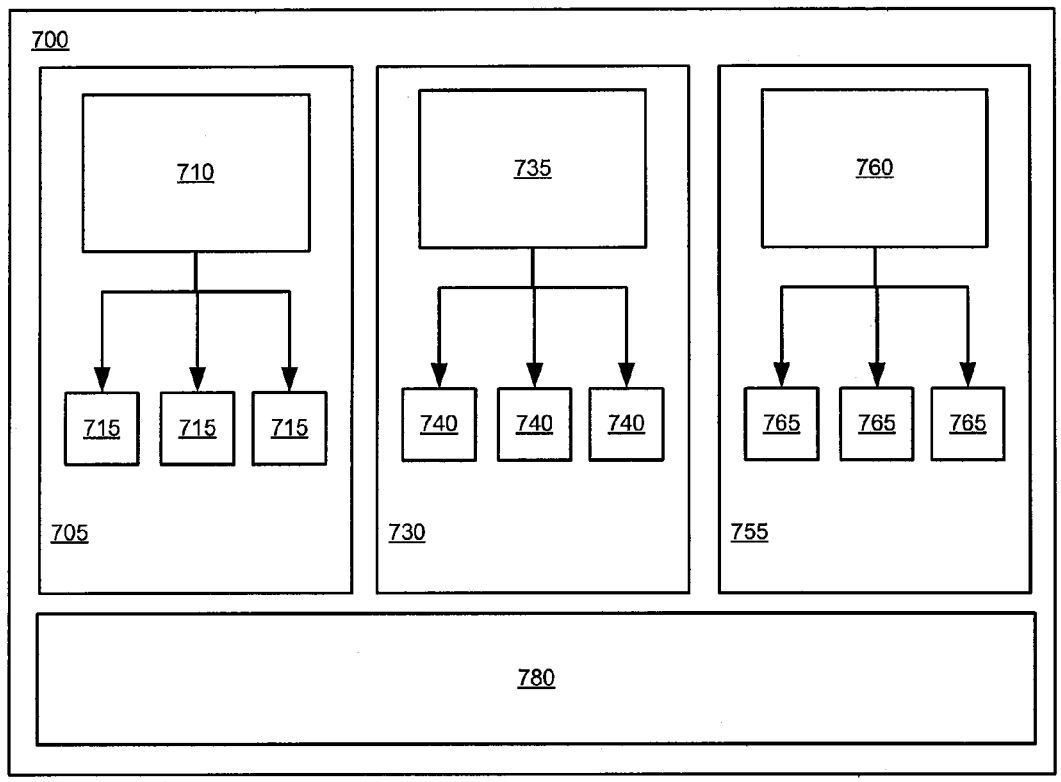
FIG. 7 is a schematic of an exemplary object database for storing account number data in accordance with an embodiment of the present invention.

With reference to FIG. 7 and in accordance with one embodiment, card provider system 3 receives from a user via a second e-commerce website, an authorization request for an authorization of a purchase transaction. The authorization request is associated with an account code, which is issued by a first e-commerce web site for use on the second e-commerce website. The card provider system 3 includes a database 700 that is logically separated into a first subsection 705, a second subsection 730, a third subsection 755, and an object repository 780. Each of the subsections may be logically separated via a firewall.

The first subsection 705 contains a high-level key class of objects 710 and a first plurality of secondary classes of objects 715 derived from the high-level key class of objects 710. Each of the first plurality of secondary classes of objects 715 defines a business unit. The second subsection 730 contains a high-level secondary class of objects 735 and a second plurality of secondary classes of objects 740 that are derived from the high-level secondary class of objects 735. Each of the second plurality of secondary classes of objects 740 defines one of a plurality of transaction codes. The second plurality of secondary classes of objects 740 inherits attributes from the high-level key class of objects 710. The third subsection 755 contains a high-level intermediate class of objects 760 and a third plurality of secondary classes of objects 765 derived from the high-level intermediate class of objects 760. Each of the third plurality of secondary classes of objects 755 may define a geographic region and a business sub-unit, for example. Each of the third plurality of secondary classes of objects 765 inherits attributes from at least one of the high-level key class 710 of objects and the high-level secondary class of objects 735.

The object repository includes a plurality of reusable classes from which the high-level key class of objects 710, the high-level intermediate class of objects 735, and the high-level secondary class of objects are derived 740. Each of the second plurality of secondary classes of objects 740 is associated with one of the plurality of transaction codes.

The card provider system 3 determines when the account code is equal to one of a plurality of valid account codes. When the account code is equal to one of the plurality of valid account codes, the card provider system 3 compares the purchase value to the monetary value that is associated with the account code to determine if the monetary value exceeds the purchase value. If the monetary value exceeds the purchase value, the card provider system 3 sends a purchase authorization message authorizing the purchase transaction and subtracts the purchase value from the monetary value that is associated with the account code.

It will be appreciated, that many applications of the present invention could be formulated. One skilled in the art will appreciate that the networks may include any system for exchanging data or transacting business, such as the Internet, an intranet, an extranet, WAN, LAN, satellite communications, and/or the like. It is noted that the networks may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

Communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

We claim:

1. A method for obtaining a account code by a user via a first e-commerce website, wherein said account code is used by said user to anonymously purchase an item from a second e-commerce website, said method comprising:

sending to an account provider system and via said first e-commerce website, an account code purchase request for a purchase of said account code;

receiving a challenge based on said account code purchase request, wherein said challenge is passed to an intelligent token for processing said challenge, wherein said intelligent token generates a response to said challenge;

sending said response based upon said challenge to said account provider system, wherein said account provider system processes said response and verifying said intelligent token and assembles credentials for said account code purchase request at said first server, said credentials comprising at least one key;

receiving a portion of said assembled credentials from said account provider system;

sending a second request, said second request including said portion of said assembled credentials provided to said user; and validating said portion of said assembled credentials provided to said user with said key of said assembled credentials providing access to purchase said account code;

sending to said account provider system and via said first e-commerce website, a load request for associating a monetary load value with said account code;

sending payment information to said account provider system, wherein said account provider system obtains authorization of said payment information and associates said monetary load value with said account code; and, receiving, from said account provider system via said first e-commerce website, said account code to enable said user to provide to a merchant, via said second e-commerce website, said account code as a form of anonymous payment for an item, wherein information sufficient to identify said user of said account code is not provided to said merchant.

2. The method of claim 1, wherein when said account code is not equal to said one of said plurality of account codes, sending a denial message denying said authorization request.

3. The method of claim 1, wherein when said purchase value exceeds said monetary value associated with said n account code, sending a denial message denying said purchase request.

4. The method of claim 1, wherein said account code is associated with an initial monetary value which is equal to zero at said generating step.

5. The method of claim 1, further comprising transmitting a monetary load request for increasing said monetary value by a reload monetary value, wherein said monetary load request is associated with said account code.

6. The method of claim 1, further comprising transmitting a monetary load request for increasing said monetary value by a reload monetary value, wherein said monetary load request is associated with said account code, adding said monetary value and reload said monetary value to obtain a second updated monetary load value; and associating said second updated monetary load value with said account code.

7. The method of claim 1, further comprising sending a balance inquiry, wherein said balance inquiry is associated with said account code.

8. The method of claim 1, further comprising receiving at least one of: said monetary value and said first updated monetary value.

9. The method of claim 1, further comprising receiving a plurality of at least one of non-activated and activated s.

10. The method of claim 1, further comprising requesting a conversion of said account code to an active account code, wherein said account code is originally a non-activated account code.

11. The method of claim 1, further comprising receiving an authorization of said purchase transaction when said monetary load value exceeds said purchase value.

12. The method of claim 1, further comprising receiving authorization of at least one of said purchase request and a form of payment to at least one of: a point-of-sale terminal, a personal data assistant, and a personal computer.

13. The method of claim 1, further comprising receiving a non-activated account code stored on a transaction card for subsequent activation.

14. The method of claim 1, wherein said account code is not associated with an account of a merchant that distributes said account code.

15. The method of claim 1, wherein said account code is associated with a use parameter.

16. The method of claim 1, wherein, said account code is associated with a use parameter, wherein said use parameter is at least one of: a maximum number of transactions, a maximum number of transactions per day, a maximum per transaction amount, and a cardholder defined expiration date.

17. The method of claim 1, wherein said monetary value is not co-mingled with monetary load values of other transaction accounts.

18. A method for obtaining a account code by a user via a first e-commerce website, wherein said account code is used by a user to anonymously purchase an item from a second e-commerce website, said method comprising:

sending to an account provider system and via said first e-commerce website, an account code purchase request for a purchase of said account code, wherein said account provider system includes:

a database logically separated into a first subsection, a second subsection, a third subsection and an object repository, wherein said first subsection, said second subsection and said third subsection are logically separated via a firewall;

said first subsection containing a high-level key class of objects and a first plurality of secondary classes of objects derived from said high-level key class of objects, wherein each of said first plurality of secondary classes of objects define a business unit;

said second subsection containing a high-level secondary class of objects and a second plurality of secondary classes of objects derived from said high-level secondary class of objects, wherein each of said second plurality of secondary classes of objects define one of said plurality of account codes and, wherein said second plurality of secondary classes of objects inherit attributes from said high-level key class of objects;

said third subsection containing a high-level intermediate class of objects and a third plurality of secondary classes of objects derived from said high-level intermediate class of objects, wherein each of said third plurality of secondary classes of objects define at least one of a geographic region and a business sub-unit and, wherein said third plurality of secondary classes of objects inherit attributes from at least one of said high-level key class of objects and said high-level secondary class of objects;

said object repository including a plurality of reusable classes from which said high-level key class of objects, said high-level intermediate class of objects, and said high-level secondary class of objects are derived and, wherein each of said second plurality of secondary classes of objects is associated with one of said plurality of account codes;

sending to said account provider system, a load request for associating a monetary load value with said account code via said first e-commerce website;

sending payment information to said account provider system, wherein said account provider system obtains authorization of said payment information and associates said monetary load value with said account code; and, receiving via said first e-commerce website, said account code to enable said user to provide to a merchant, via said second e-commerce website, said account code as a form of anonymous payment for an item, wherein information sufficient to identify said user of said account code is not provided to said merchant.

19. The method of claim 1, wherein said account provider system comprises:

a database logically separated into a first subsection, a second subsection, a third subsection and an object repository, wherein said first subsection, said second subsection and said third subsection are logically separated via a firewall;

said first subsection containing a high-level key class of objects and a first plurality of secondary classes of objects derived from said high-level key class of objects, wherein each of said first plurality of secondary classes of objects define a business unit;

said second subsection containing a high-level secondary class of objects and a second plurality of secondary classes of objects derived from said high-level secondary class of objects, wherein each of said second plurality of secondary classes of objects define one of said plurality of account codes and, wherein said second plurality of secondary classes of objects inherit attributes from said high-level key class of objects;

said third subsection containing a high-level intermediate class of objects and a third plurality of secondary classes of objects derived from said high-level intermediate class of objects, wherein each of said third plurality of secondary classes of objects define at least one of a geographic region and a business sub-unit and, wherein said third plurality of secondary classes of objects inherit attributes from at least one of said high-level key class of objects and said high-level secondary class of objects;

said object repository including a plurality of reusable classes from which said high-level key class of objects, said high-level intermediate class of objects, and said high-level secondary class of objects are derived and, wherein each of said second plurality of secondary classes of objects is associated with one of said plurality of account codes.

20. The method of claim 1, further comprising:

transmitting said request for an authorization of said account code purchase request for a full purchase amount of said account code, wherein said account code purchase request includes a merchant identifier and wherein, said account provider system:

approves said request for an authorization of a purchase based on monetary load value and said full purchase amount;

receives, from said user, a request to apply a currency value of said loyalty points to at least a portion of said full purchase amount;

retrieves information from said loyalty program database, including an amount of at least a portion of said loyalty points accumulated by said user;

performs an analysis of said merchant identifier to determine a conversion ratio based on said merchant identifier and based on at least one of: a date of said transaction, inventory data, status of said participant, and method of facilitating said transaction;

presents said user with a request to approve said conversion ratio;

receives an indicator of at least one of: an approval and disapproval of said conversion ratio from said user, wherein said transaction is canceled when said indicator is a disapproval of said conversion ratio;

receives a request from said user to convert said loyalty points already existing in said loyalty program database to said currency value using said conversion ratio;

retrieves said loyalty points from said loyalty program database system;

converts said amount of said loyalty points to said currency value using a computerized conversion processor, wherein said converting is based on said conversion ratio;

applies said currency value as a credit to a transaction account associated with said first account code, wherein said transaction account is stored on a second database system;

offsets a previously executed transaction with said currency value, wherein said previously executed charge is provided to said user in a billing statement; and, increases said monetary load value due to said offset of said previously executed charge.

21. The method of claim 1, wherein said account code includes a field for defining a limited use parameter, said limited use parameter including at least one of: use of said corresponding account code of a limited number of transactions, a user defined expiration date, a dollar amount per transaction, a dollar amount per a defined period of time, a merchant where said corresponding account code may be used, and a merchant where said corresponding account code may not be used.

* * * * *